United States Patent
Iwatsuki et al.

(10) Patent No.: US 7,216,618 B2
(45) Date of Patent: May 15, 2007

(54) CONTROL APPARATUS FOR DRIVING VEHICLE AND CONTROL METHOD FOR DRIVING VEHICLE

(75) Inventors: Ken Iwatsuki, Anjo (JP); Toshio Okoshi, Anjo (JP); Takeshi Hara, Anjo (JP)

(73) Assignee: Aisin AW Co., Ltd., Aichi-ken (JP)

( * ) Notice: Subject to any disclaimer, the term of this patent is extended or adjusted under 35 U.S.C. 154(b) by 0 days.

(21) Appl. No.: 11/052,278

(22) Filed: Feb. 8, 2005

(65) Prior Publication Data
US 2006/0037573 A1 Feb. 23, 2006

(30) Foreign Application Priority Data
Feb. 9, 2004 (JP) ............................. 2004-032062

(51) Int. Cl.
*F02N 11/08* (2006.01)
(52) U.S. Cl. .................................................. 123/179.4
(58) Field of Classification Search ............. 123/179.3, 123/179.4, 179.5
See application file for complete search history.

(56) References Cited

U.S. PATENT DOCUMENTS

| 5,632,238 A | * | 5/1997 | Furukawa et al. | ........ 123/179.3 |
| 6,675,758 B2 | * | 1/2004 | Nagata et al. | ........... 123/192.1 |
| 6,722,456 B2 | | 4/2004 | Hisada | |

* cited by examiner

*Primary Examiner*—Stephen K. Cronin
*Assistant Examiner*—Arnold Castro
(74) *Attorney, Agent, or Firm*—Sughrue Mion, PLLC

(57) ABSTRACT

A control apparatus for driving a vehicle and a control method for driving a vehicle. A control apparatus for driving a vehicle has an engine start permission output control processing module which reads engine rotational speed; determines whether the engine rotational speed takes a value within a predetermined start disable range; does not output an engine start permission when the engine rotational speed takes a value within the start disable range; and outputs an engine start permission when the engine rotational speed takes a value except a value within the start disable range, and has an engine start control processing module which starts an engine when the engine start permission is outputted. An engine start permission is not outputted and the engine is not started when the engine rotational speed takes the value except the value within the start disable range.

6 Claims, 12 Drawing Sheets

CONTROL APPARATUS FOR DRIVING VEHICLE AND CONTROL METHOD FOR DRIVING VEHICLE

BACKGROUND OF THE INVENTION

This application claims the priority of Japanese Patent Application No. 2004-032062, filed on Feb. 9, 2004, in the Japan Patent Office, the disclosure of which is incorporated herein by reference in its entirety.

FIELD OF THE INVENTION

The present invention relates to a control apparatus for driving a vehicle and a control method for driving a vehicle.

DESCRIPTION OF THE INVENTION

Traditionally, in a vehicle drive apparatus mounted on a hybrid vehicle as a motor-driven vehicle which transmits a part of engine torque to be torque of an engine to a generator (generator motor) and the remainder to driving wheels, it has a planetary gear unit as a differential rotation unit having a sun gear, a ring gear and a carrier in which the sun gear is joined to the generator, the ring gear and a drive motor are joined to the driving wheels, the carrier is joined to the engine, and the rotation outputted from the ring gear and the drive motor is transmitted to the driving wheels to generate driving force.

In the hybrid vehicle, an inverter is disposed between the drive motor and a drive motor control apparatus in which the inverter is driven in accordance with a drive signal sent from the drive motor control apparatus, receives the power of direct current from a battery to generate the currents of phase U, phase V and phase W, and supplies the current of each phase to the drive motor. Therefore, the inverter has transistors for example, six transistors, as switching devices, in which the individual transistors are formed in a unit by one pair each to configure a transistor module, Insulated Gate Bipolar Transistor (IGBT), for each phase. Thus, when the drive signal is sent to the individual transistors in a given pattern, the transistors are turned on and off to generate the current of each phase.

Then, a drive motor rotational speed sensor detects drive motor rotational speed to be the rotational speed of the drive motor, and controls the drive motor torque to be the torque of the drive motor, for example, based on the drive motor rotational speed (for example, see JP-A-2002-12046).

However, in a traditional hybrid vehicle, when the amount of battery remaining is small or when a driver presses down an accelerator pedal, for example, the engine is started, whereas when the amount of battery remaining is large or when the driver release the accelerator pedal, the engine is stopped. Great vibrations are generated in the engine rotational speed NE to be the rotational speed of the engine as the engine starts, and these vibrations sometimes produce discomfort to the driver.

FIG. 2 is a time chart illustrating the operation of a vehicle control apparatus when the traditional engine is started, and FIG. 3 is a time chart illustrating the state of generating vibrations when the traditional engine is started.

In the drawing, an engine stop request is outputted at timing t1 and the engine stop request signal Sg1 is turned to high level in the vehicle control apparatus, while the engine is being rotated at the engine rotational speed NE based on the engine target rotational speed NE* that indicates a target value of the engine rotational speed NE. Then, fuel injection and ignition are stopped and the engine target rotational speed NE* is reduced in a pattern as shown in FIG. 3 as well as the engine rotational speed NE follows it to decrease.

Subsequently, the engine stop request is not outputted and the engine stop request signal Sg1 is turned to low level at timing t2 in the vehicle control apparatus as well as an engine start request is outputted and the engine start request signal Sg2 is turned to high level, and then fuel injection and ignition are performed. After timing t2, the engine target rotational speed NE* is increased in a pattern as shown in FIG. 3 as well as the engine rotational speed NE follows it to increase.

In the meantime, the engine rotational speed NE decreases over time from timing t1 to timing t2, whereas the engine rotational speed NE increases over time after timing t2. Therefore, the engine rotational speed NE is reversed at timing t2.

However, the vehicle drive apparatus has the predetermined number of unique vibrations, and a resonance range based on the number of unique vibrations is formed between the engine rotational speeds NE1 and NE2. Thus, when the engine rotational speed NEx takes the value within the resonance range at timing t2, great vibrations are generated in the engine rotational speed NE as the engine rotational speed NE is reversed.

When the amplitude h of the engine rotational speed NE becomes greater, teeth of various gears and splines which configure the vehicle drive apparatus hit against each other to cause the gears and splines to deteriorate by abrasion. In this case, the durability of the vehicle drive apparatus is decreased.

SUMMARY OF THE INVENTION

An aspect of the invention is to provide a control apparatus for driving a vehicle and a control method for driving a vehicle which addresses the problems of the traditional hybrid vehicle, prevents great vibrations from being generated in the engine rotational speed as the engine starts, and prevents the durability of the vehicle drive apparatus from being decreased without producing discomfort for a driver.

To this end, a control apparatus for driving a vehicle according to the invention has an engine start permission output control processing module which reads engine rotational speed; determines whether the engine rotational speed takes a value within a predetermined start disable range; does not output an engine start permission when the engine rotational speed takes a value within the start disable range; and outputs an engine start permission when the engine rotational speed takes a value except a value within the start disable range, and an engine start control processing module which starts an engine when the engine start permission is outputted.

Another control apparatus for driving a vehicle consistent with an exemplary embodiment of the invention has an engine drive determination processing module which outputs an engine start request and an engine stop request based on whether the engine is placed in a drive range.

The engine start permission output control processing module determines whether the engine rotational speed takes the value within the start disable range while the engine target rotational speed is being reduced as the engine stop request is outputted.

In still another control apparatus for driving a vehicle consistent with an exemplary embodiment of the invention, when the engine stop request is outputted to correspondingly start reducing the engine rotational speed, the engine rotational speed takes the value within the start disable range and then the engine start request is outputted, the engine start permission output control processing module delays output of the engine start permission until the engine rotational speed takes the value except the value within the start disable range.

In another control apparatus for driving a vehicle consistent with an exemplary embodiment of the invention, when the engine stop request is outputted to correspondingly start reducing the engine rotational speed, the engine rotational speed takes the value except the value within the start disable range before or after the engine rotational speed takes the value within the start disable range and then the engine start request is outputted, the engine start permission output control processing module immediately outputs the engine start permission.

In still another control apparatus for driving a vehicle consistent with an exemplary embodiment of the invention, the start disable range is set in a resonance range that is formed based on the number of unique vibrations of a vehicle drive apparatus.

In another control apparatus for driving a vehicle consistent with an exemplary embodiment of the invention, the start disable range is set by adding a margin to a resonance range that is formed based on the number of unique vibrations of a vehicle drive apparatus.

In another control apparatus for driving a vehicle consistent with an exemplary embodiment of the invention, the start disable range is set in a resonance range that is formed based on the number of unique vibrations of a vehicle drive apparatus, and in a range lower than a low limit value of the engine rotational speed that forms the resonance range.

A control method for driving a vehicle according to the invention includes: reading engine rotational speed; determining whether the engine rotational speed takes a value within a predetermined start disable range; not outputting an engine start permission when the engine rotational speed takes a value within the start disable range; outputting an engine start permission when the engine rotational speed takes a value except a value within the start disable range; and starting an engine when the engine start permission is outputted.

Consistent with an exemplary embodiment of the invention, the control apparatus for driving the vehicle has the engine start permission output control processing module which reads engine rotational speed; determines whether the engine rotational speed takes the value within the predetermined start disable range; does not output an engine start permission when the engine rotational speed takes the value within the start disable range; and outputs an engine start permission when the engine rotational speed takes the value except the value within the start disable range, and has the engine start control processing module which starts the engine when the engine start permission is outputted.

In this case, it is determined whether the engine rotational speed takes the value within the predetermined start disable range. The engine start permission is not outputted and the engine is not started when the engine rotational speed takes the value within the start disable range. Therefore, great vibrations can be prevented from being generated in the engine rotational speed as the engine starts. Accordingly, discomfort to a driver does not result.

Since the amplitude of the engine rotational speed is small, the teeth of various gears and splines configuring the vehicle drive apparatus are not hit against each other. Also, since vibrations caused by damper units and mounts become small, gears, splines, damper units and mounts are prevented from being deteriorated. Accordingly, the durability of the vehicle drive apparatus can be prevented from being decreased.

BRIEF DESCRIPTION OF THE DRAWINGS

The teachings of the invention can be readily understood by considering the following detailed description in conjunction with the accompanying drawings, in which.

DESCRIPTION OF THE EXEMPLARY EMBODIMENT

Hereinafter, an embodiment consistent with the invention will be described in detail with reference to the drawings. In this case, a hybrid vehicle as a motor-driven vehicle will be described.

Figure 1:
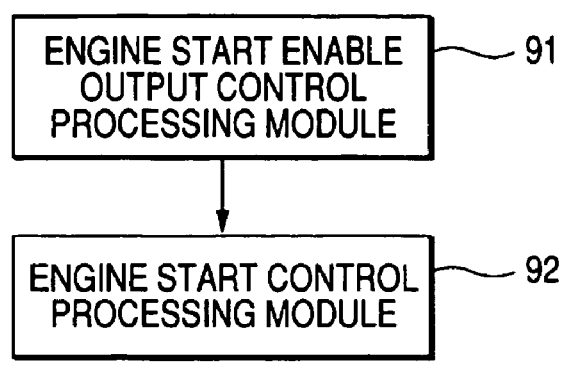
FIG. 1 is a functional block diagram illustrating a control apparatus for driving a vehicle in an exemplary embodiment consistent with the invention.
Figure 2:
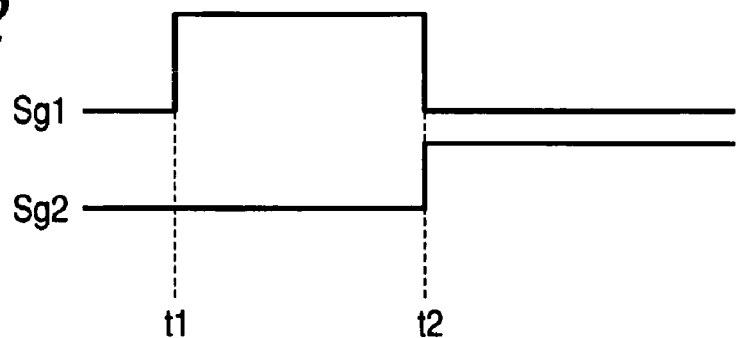
FIG. 2 is a time chart illustrating the operation of the vehicle control apparatus when the traditional engine is started.
Figure 3:
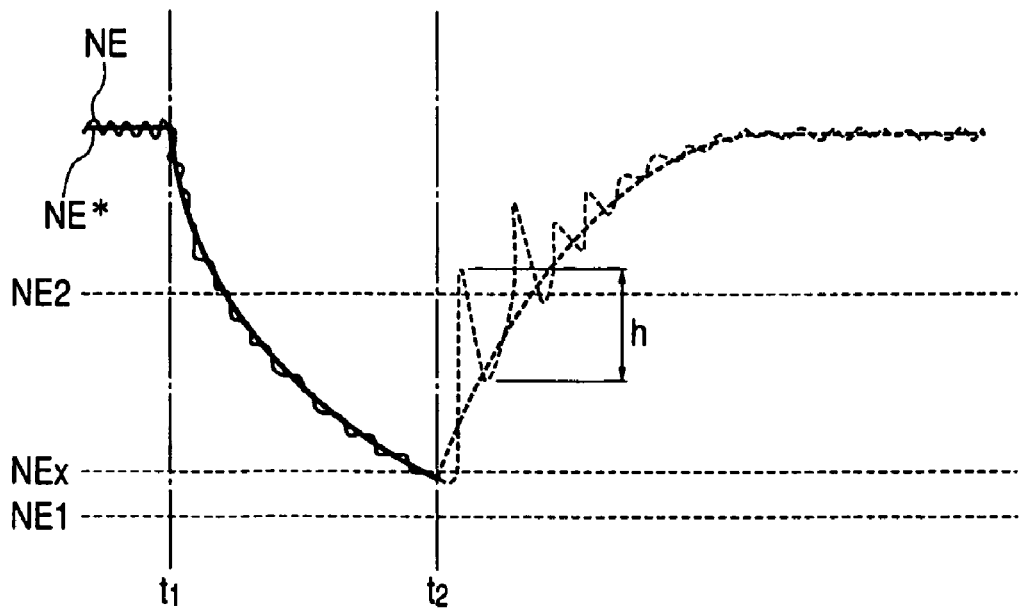
FIG. 3 is a time chart illustrating the state of generating vibrations when the traditional engine is started.

FIG. 1 is a functional block diagram illustrating a control apparatus for driving a vehicle in an exemplary embodiment consistent with the invention.

In the drawing, engine start permission output control processing module 91 reads the engine rotational speed NE, determines whether the engine rotational speed NE takes the value within a predetermined start disable range, does not output an engine start permission when the engine rotational speed NE takes the value within the start disable range, and outputs an engine start permission when the engine rotational speed NE takes the value except the value within the start disable range. Engine start control processing module 92 starts an engine, when the engine start permission is outputted.

Next, the hybrid vehicle will be described.

Figure 4:
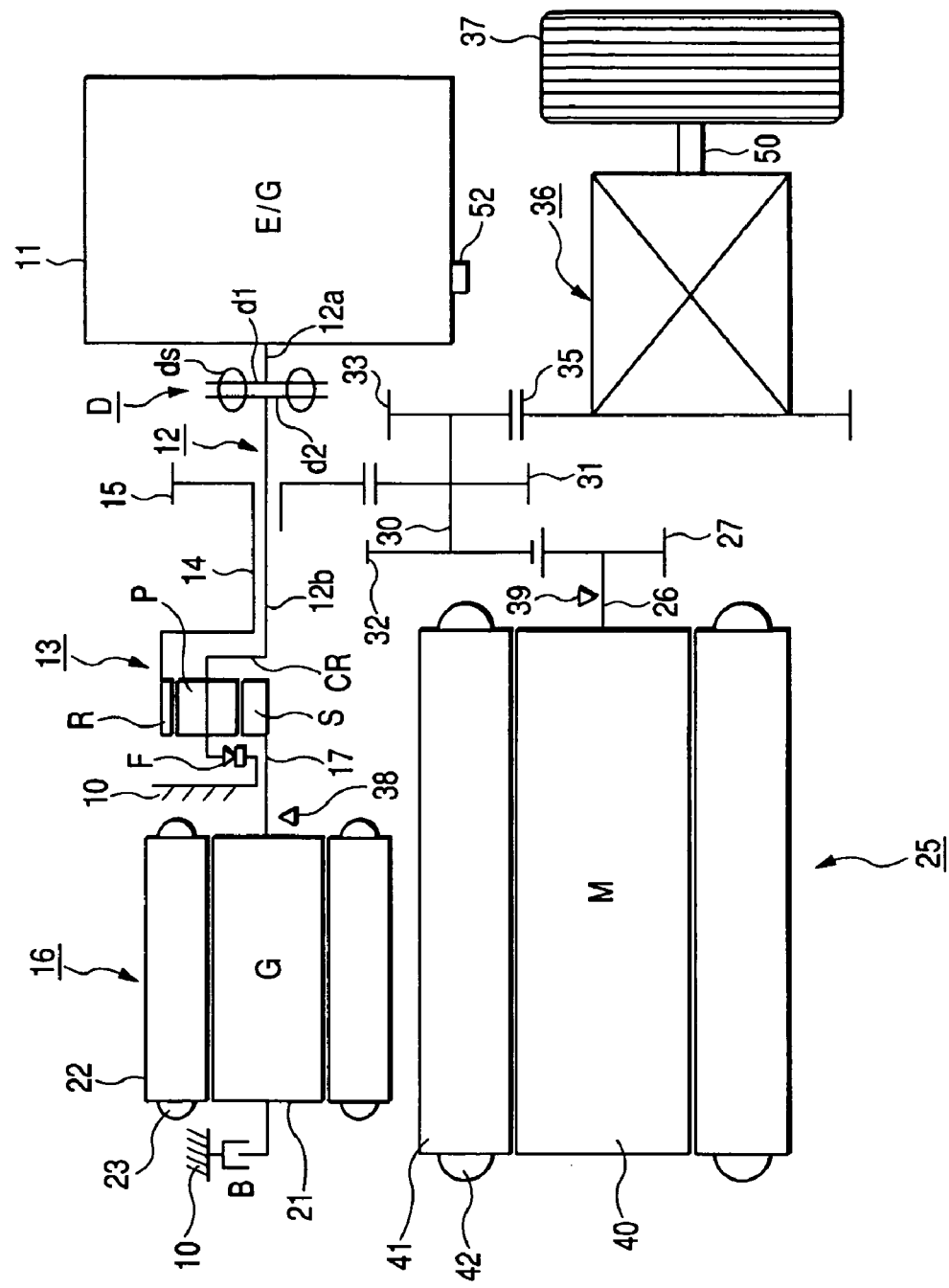
FIG. 4 is a conceptual diagram illustrating a hybrid vehicle in an exemplary embodiment consistent with the invention.

FIG. 4 is a conceptual diagram illustrating the hybrid vehicle in an exemplary embodiment consistent with the invention.

In the drawing, reference numeral 10 denotes a case of the vehicle drive apparatus, reference numeral 11 denotes an engine (E/G) as a driving source which is disposed on a first shaft line, reference numeral 12 denotes an output shaft which is disposed on the first shaft line and outputs the rotation generated by driving the engine 11, reference numeral 13 denotes a planetary gear unit as a differential rotation unit which is disposed on the first shaft line and shifts speed to the rotation inputted through the output shaft 12, reference numeral 14 denotes an output shaft which is disposed on the first shaft line and to which the rotation after being shifted by the planetary gear unit 13 is outputted thereto, reference numeral 15 denotes a first counter drive gear as an output gear which is fixed to the output shaft 14, and reference numeral 16 denotes a generator (G) as a driving source and a first electric machine which is disposed on the first shaft line, joined to the planetary gear unit 13 through a transmission shaft 17, and differentially rotatably and, mechanically joined to the engine 11. The generator 16 is also mechanically joined to the driving wheel 37.

A damper unit D is disposed on the output shaft 12. The damper unit D is connected between an input part 12a on the engine 11 side and an output part 12b on the planetary gear unit 13 side of the output shaft 12, which has a drive member d1 mounted on the input part 12a, a driven member d2 mounted on the output part 12b, and a spring ds as an energizing member disposed between the drive member d1 and the driven member d2. The engine torque TE transmitted to the drive member d1 through the input part 12a is transmitted to the spring ds, and is transmitted to the driven member d2 after sudden variations are absorbed in the spring ds, and then it is outputted to the output part 12b.

The output shaft 14 has a sleeve shape, and is disposed as surrounding the output shaft 12. The first counter drive gear 15 is placed more on the engine 11 side than the planetary gear unit 13.

The planetary gear unit 13 at least has a sun gear S as a first differential element, a pinion P which gears with the sun gear S, a ring gear R as a second differential element which gears with the pinion P, and a carrier CR as a third differential element which rotationally supports the pinion P. The sun gear S is joined to the generator 16 though the transmission shaft 17, and the ring gear R is joined to the driving wheel 37 and to a drive motor (M) 25 as a driving source and a second electric machine which is differentially rotatable and, mechanically joined to the engine 11 and the generator 16, the motor (M) 25 and the driving wheel 37 being disposed on a second shaft line in parallel with the first shaft line through the output shaft 14 and a given gear row.

The carrier CR is joined to the engine 11 through the output shaft 12. The drive motor 25 is mechanically joined to the driving wheel 37. A one way clutch F is disposed between the carrier CR and the case 10. The one way clutch F is freed when the engine 11 transmits the forward rotation to the carrier CR, whereas it is locked when the generator 16 or the drive motor 25 transmits the reverse rotation to the carrier CR, and it stops the rotation of the engine 11 to prevent the reverse rotation from being transmitted to the engine 11. Therefore, when the generator 16 is driven with the drive of the engine 11 stopped, the one way clutch F applies a reaction force to the torque transmitted by the generator 16. Instead of the one way clutch F, it is acceptable to dispose brakes, not shown, as a stop module between the carrier CR and the case 10.

The generator 16 is formed of a rotor 21 which is rotationally fixed to the transmission shaft 17, a stator 22 which is disposed around the rotor 21, and a coil 23 which is wounded on the stator 22. The generator generates power by the rotation transmitted through the transmission shaft 17. To this end, the coil 23 is connected to a battery, not shown, and supplies direct current to the battery. Generator brakes B are disposed between the rotor 21 and the case 10, and the generator brakes B are engaged to allow the rotor 21 to be fixed and to allow the rotation of the generator 16 to be mechanically stopped.

Reference numeral 26 denotes an output shaft which is disposed on the second shaft line and to which the rotation of the drive motor 25 is outputted thereto, and reference numeral 27 denotes a second counter drive gear as an output gear which is fixed to the output shaft 26. The drive motor 25 is formed of a rotor 40 which is rotationally fixed to the output shaft 26, a stator 41 which is disposed around the rotor 40, and a coil 42 which is wound on the stator 41.

The drive motor 25 generates the drive motor torque TM by the currents of phase U, phase V and phase W as alternating current to be supplied to the coil 42. To this end, the coil 42 is connected to the battery, and the direct current from the battery is converted to the current of each phase to be supplied to the coil 42.

In order to rotate the driving wheel 37 in the same direction as the engine 11 is rotated, a counter shaft 30 is disposed on a third shaft line in parallel with the first and second shaft lines, and a first counter driven gear 31 and a second counter driven gear 32 having the number of teeth greater than those of the first counter driven gear 31 are fixed to the counter shaft 30. The first counter driven gear 31 and the first counter drive gear 15 are geared with each other, and the second counter driven gear 32 and the second counter drive gear 27 are geared with each other. The rotation of the first counter drive gear 15 is reversed and transmitted to the first counter driven gear 31, and the rotation of the second counter drive gear 27 is reversed and transmitted to the second counter driven gear 32. To counter shaft 30, a differential pinion gear 33 is fixed which has the number of teeth smaller than those of the first counter driven gear 31.

A differential unit 36 is disposed on a fourth shaft line in parallel with the first to third shaft lines, and a differential ring gear 35 of the differential unit 36 is geared with the differential pinion gear 33. Therefore, the differential unit 36 splits and transmits the rotation transmitted to the differential ring gear 35 to the driving wheel 37. In this manner, the rotation generated by the engine 11 can be transmitted to the first counter driven gear 31 as well as the rotation generated by the drive motor 25 can be transmitted to the second counter driven gear 32. Thus, the engine 11 and the drive motor 25 are driven to run the hybrid vehicle.

In the hybrid vehicle of the configuration, a shift lever as a transmission operating member, not shown, is operated to select a given range from a forward range, a backward range, a neutral range and a parking range, and then a shift position determination unit, not shown, determines the selected range to create and send a range position signal to a vehicle control apparatus, not shown.

Reference numeral 38 denotes a position sensor as a first the rotor position detecting part, such as a resolver, which detects the rotor position θG that is the position of the rotor 21, and reference numeral 39 denotes a position sensor as a second the rotor position detecting part, such as a resolver, which detects the rotor position θM that is the position of the rotor 40. The detected rotor position θG is sent to the vehicle control apparatus and a generator control unit, not shown, and the rotor position θM is sent to the vehicle control apparatus and a drive motor control unit, not shown. Reference numeral 50 denotes a driving shaft as an output shaft for the differential unit 36, reference numeral 52 denotes an engine rotational speed sensor as an engine rotational speed detecting part which detects the engine rotational speed NE. The detected engine rotational speed NE is sent to the vehicle control apparatus and an engine control unit, not shown. The vehicle drive apparatus is configured of the engine 11, the planetary gear unit 13, the generator 16, the drive motor 25, the counter shaft 30 and the differential unit 36.

Next, the operation of the planetary gear unit 13 will be described.

Figure 5:
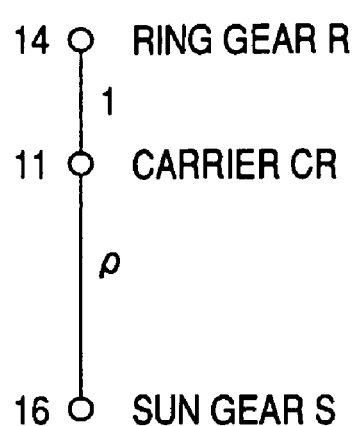
FIG. 5 is a diagram for describing the operation of a planetary gear unit in an exemplary embodiment consistent with the invention.
Figure 6:
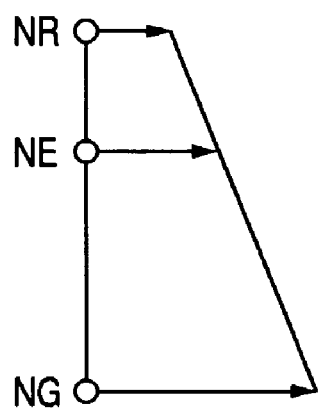
FIG. 6 is a speed diagram in normal running in an exemplary embodiment consistent with the invention
Figure 7:
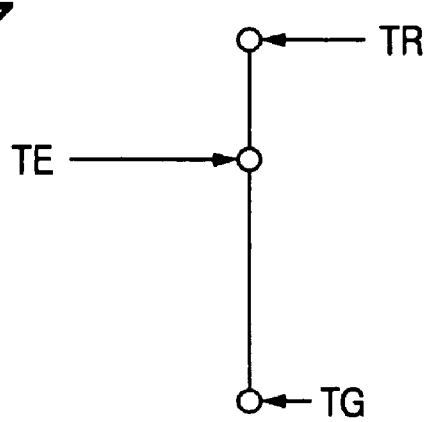
FIG. 7 is a torque diagram in normal running in an exemplary embodiment consistent with the invention.

FIG. 5 is a diagram for describing the operation of the planetary gear unit in the exemplary embodiment consistent with the invention, FIG. 6 is a speed diagram in normal driving in the exemplary embodiment consistent with the invention, and FIG. 7 is a torque diagram in normal driving in the exemplary embodiment consistent with the invention.

In the planetary gear unit 13 (FIG. 4), the carrier CR is joined to the engine 11, the sun gear S is joined to the generator 16, and the ring gear R is joined to the drive motor 25 and the driving wheel 37 through the output shaft 14 and a given gear row. Therefore, the ring gear rotational speed NR that is the rotational speed of the ring gear R is equal to the output shaft rotational speed that is the rotational speed outputted to the output shaft 14, the rotational speed of the carrier CR is equal to the engine rotational speed NE, and the rotational speed of the sun gear S is equal to the generator rotational speed NG that is the rotational speed of the generator 16. When the number of teeth of the ring gear R is ρ times the number of teeth of the sun gear S (it is doubled in the embodiment), the following relation is held as:

$$(\rho+1) \cdot NE = 1 \cdot NG + \rho \cdot NR$$

Thus, the engine rotational speed NE can be calculated based on the ring gear rotational speed NR and the generator rotational speed NG as:

$$NE = (1 \cdot NG + \rho \cdot NR)/(\rho+1) \quad (1)$$

In addition, Expression (1) can configure the relational expression of the rotational speed of the planetary gear unit 13.

The engine torque TE, the ring gear torque TR that is the torque of the ring gear R, and the generator torque TG that is the torque of the generator 16 have the following relation:

$$TE:TR:TG = (\rho+1):\rho:1 \quad (2)$$

and receive a reacting force from each other. Expression (2) configures the torque relational expression of the planetary gear unit 13.

In the hybrid vehicle in normal driving, the ring gear R, the carrier CR and the sun gear S are all rotated forward. As shown in FIG. 6, the ring gear rotational speed NR, the engine rotational speed NE and the generator rotational speed NG all take positive values. The ring gear torque TR and the generator torque TG can be obtained by dividing the engine torque TE by the torque ratio decided by the number of teeth of the planetary gear unit 13. Thus, in the torque diagram shown in FIG. 7, the ring gear torque TR is added to the generator torque TG to make the engine torque TE.

Next, the control apparatus for driving the vehicle which controls the vehicle drive apparatus will be described.

Figure 8:
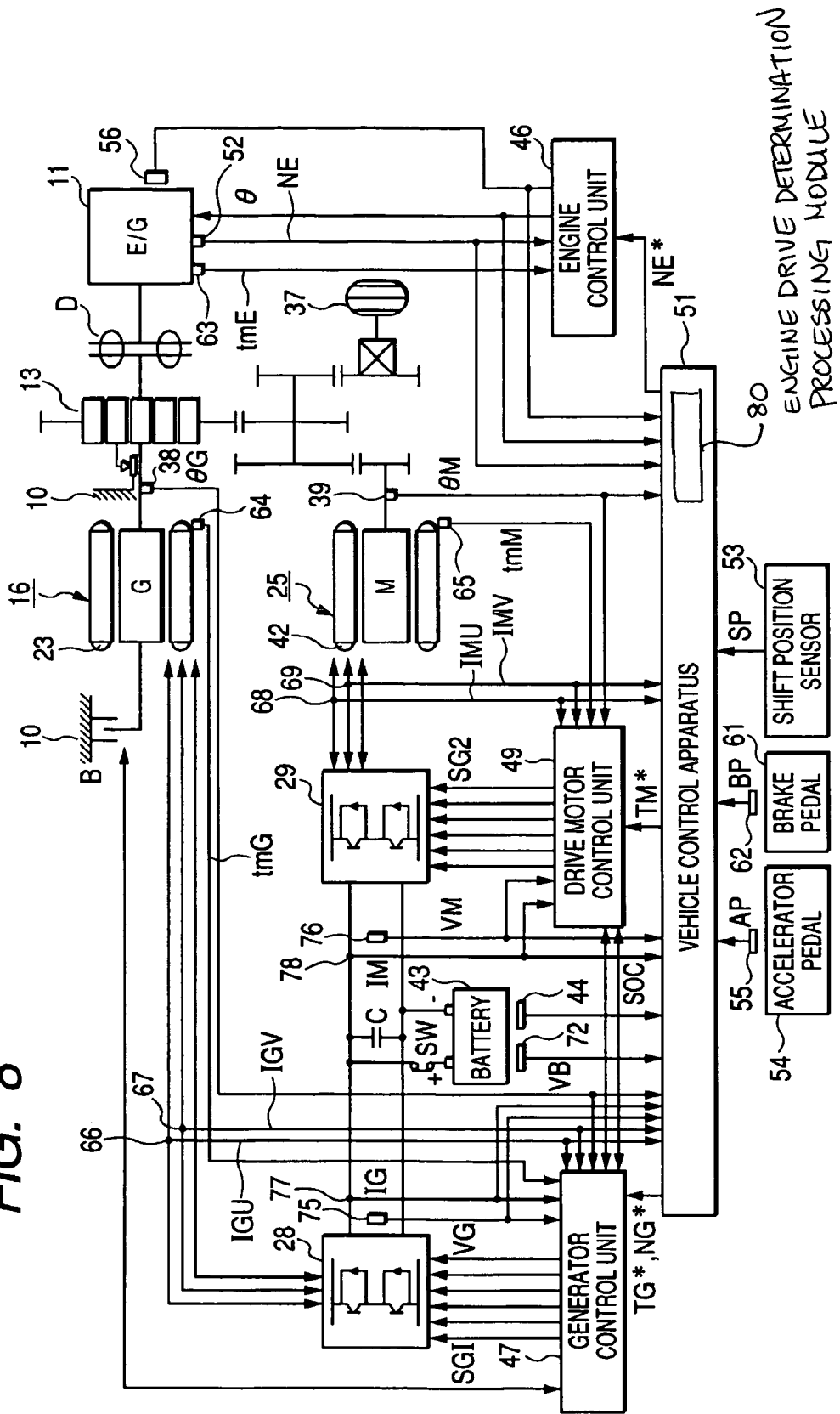
FIG. 8 is a conceptual diagram illustrating the control apparatus for driving the vehicle in an exemplary embodiment consistent with the invention.

FIG. 8 is a conceptual diagram illustrating the control apparatus for driving the vehicle in the exemplary embodiment consistent with the invention.

In the drawing, reference numeral 10 denotes the case of the vehicle drive apparatus, reference numeral 11 denotes the engine (E/G), D denotes the damper unit, reference numeral 13 denotes the planetary gear unit, reference numeral 16 denotes the generator (G), B denotes the generator brakes, reference numeral 25 denotes the drive motor (M), reference numeral 28 denotes an inverter as a generator inverter which drives the generator 16, reference numeral 29 denotes an inverter as a drive motor inverter which drives the drive motor 25, reference numeral 37 denotes the driving wheel, reference numerals 38 and 39 denote the position sensors, and 43 denotes a battery. The inverters 28, 29 are connected to the battery 43 through a power switch SW, and the battery 43 supplies direct current to the inverters 28, 29 when the power switch SW is ON. Each of the inverters 28, 29 has multiple transistors, for example, six transistors, as switching devices, and the individual transistors are formed in a unit by one pair each to configure a transistor module for each phase.

On the input side of the inverter 28, a generator inverter voltage sensor 75 as a first direct current voltage detecting part is disposed which detects the generator inverter voltage VG that is direct current voltage applied to the inverter 28, and a generator inverter current sensor 77 as a first direct current detecting part is disposed which detects the generator inverter current IG that is direct current supplied to the inverter 28.

On the input side of the inverter 29, a drive motor inverter voltage sensor 76 as a second direct current voltage detecting part is disposed which detects the drive motor inverter voltage VM that is direct current voltage applied to the inverter 29, and a drive motor inverter current sensor 78 as a second direct current detecting part is disposed which detects the drive motor inverter current IM that is direct current supplied to the inverter 29. The generator inverter voltage VG and the generator inverter current IG are sent to a vehicle control apparatus 51 and a generator control unit 47, and the drive motor inverter voltage VM and the drive motor inverter current IM are sent to the vehicle control apparatus 51 and a drive motor control unit 49. A smoothing condenser C is connected between the battery 43 and the inverters 28, 29.

The vehicle control apparatus 51 is formed of a CPU and a recording device, not shown, and controls the entire vehicle drive apparatus, functioning as a computer in accordance with given programs and data. To the vehicle control apparatus 51, an engine control unit 46, the generator control unit 47 and the drive motor control unit 49 are connected. The engine control unit 46 is formed of a CPU and a recording device, not shown, and sends instruction signals such as the throttle position 0 and valve timing for controlling the engine 11 to the engine 11 and the vehicle control apparatus 51. The generator control unit 47 is formed of a CPU and a recording device, not shown, and sends the drive signal Sg1 for controlling the generator 16 to the inverter 28.

The drive motor control unit 49 is formed of a CPU and a recording device, not shown, and sends the drive signal Sg2 for controlling the drive motor 25 to the inverter 29. The engine control unit 46, the generator control unit 47 and the drive motor control unit 49 configure a first control apparatus that is subordinate to the vehicle control apparatus 51, and the vehicle control apparatus 51 configures a second control apparatus that is at upper level than the engine control unit 46, the generator control unit 47 and the drive motor control unit 49. The engine control unit 46, the generator control unit 47 and the drive motor control unit 49 also function as computers in accordance with given programs and data.

The inverter 28 is driven in accordance with the drive signal Sg1. It receives direct current from the battery 43 in power running, and generates and supplies the currents IGU, IGV, IGW of the individual phases to the generator 16, whereas it receives the currents IGU, IGV, IGW of the individual phases from the generator 16 in regeneration, and generates and supplies direct current to the battery 43.

The inverter 29 is driven in accordance with the drive signal Sg2. It receives direct current from the battery 43 in power running, and generates and supplies the currents TMU, IMV, IMW of the individual phases to the drive motor 25, whereas it receives the currents TMU, IMV, IMW of the individual phases from the drive motor 25 in regeneration, and generates and supplies direct current to the battery 43.

Reference numeral 44 denotes a battery remaining amount detecting unit which detects the battery remaining amount SOC as battery conditions that is the conditions of the battery 43, reference numeral 52 denotes an engine rotational speed sensor which detects the engine rotational speed NE, reference numeral 53 denotes a shift position sensor which detects the shift position SP, reference numeral 54 denotes an accelerator pedal, and reference numeral 55 denotes an accelerator switch as an accelerator operation detecting part which detects the accelerator pedal position AP that is the position (press down amount) of the accelerator pedal 54.

Reference numeral 61 denotes a brake pedal, reference numeral 62 denotes a brake switch as a brake operation detecting part which detects the brake pedal position BP that is the position (press down amount) of the brake pedal 61, reference numeral 63 denotes an engine temperature sensor which detects the temperature tmE of the engine 11, reference numeral 64 denotes a generator temperature sensor which detects the temperature of the generator 16, for example, the temperature tmG of the coil 23, and reference numeral 65 denotes a drive motor temperature sensor which detects the temperature of the drive motor 25, for example, the temperature tmE of the coil 42. The temperature tmE is sent to the engine control unit 46, the temperature tmG is sent to the generator control unit 47, and the temperature tmM is sent to the drive motor control unit 49.

Reference numerals 66 to 69 denote current sensors as alternating current detecting parts which detect the currents IGU, IGV, IMU, IMV of the individual phases, and 72 denotes a battery voltage sensor as a voltage detecting part for the battery 43 which detects the battery voltage VB as the battery conditions. The battery voltage VB and the battery remaining amount SOC are sent to the generator control unit 47, the drive motor control unit 49 and the vehicle control apparatus 51. As the battery conditions, the battery current and the battery temperature can be detected. The battery remaining amount detecting unit 44, the battery voltage sensor 72, a battery current sensor, not shown, and a battery temperature sensor, not shown, configure a battery condition detecting part. The currents IGU, IGV are supplied to the generator control unit 47 and the vehicle control apparatus 51, and the currents IMU, IMV are supplied to the drive motor control unit 49 and the vehicle control apparatus 51.

The vehicle control apparatus 51 sends an engine control signal to the engine control unit 46, and the engine control unit 46 sets starting and stopping of the engine 11.

A generator rotational speed calculation processing module of generator control unit 47, not shown, performs a generator rotational speed calculation process. The generator rotational speed calculation processing module reads the rotor position θG, differentiates the rotor position θG to calculate the change rate σθG, and turns the change rate σθG to the angular velocity αG of the generator 16 and to the generator rotational speed NG. A generator angular acceleration calculation processing module of the generator control unit 47, not shown, performs a generator angular acceleration calculation process. The generator angular accelerator calculation processing module further differentiates the change rate σθG to calculate the angular acceleration (rotation the change rate) αG of the generator 16.

A drive motor rotational speed calculation processing module of the drive motor control unit 49, not shown, performs a drive motor rotational speed calculation process. It reads the rotor position θM, differentiates the rotor position θM to calculate the change rate σθM, and turns the change rate σθM to the angular velocity ωM of the drive motor 25 and to the drive motor rotational speed NM.

A velocity calculation processing module of the vehicle control apparatus 51, not shown, performs a velocity calculation process. It reads the rotor position θM, calculates the change rate σθM based on the rotor position θM, and calculates the velocity V based on the change rate σθM and the gear ratio γV in a torque transmission system from the output shaft 26 to the driving shaft 37.

The vehicle control apparatus 51 sets the engine target rotational speed NE* that indicates a target value of the engine rotational speed NE, the generator target rotational speed NG* that indicates a target value of the generator rotational speed NG, the generator target torque TG* that indicates a target value of the generator torque TG, and the drive motor target torque TM* that indicates a target value of the drive motor torque TM. The engine target rotational speed NE*, the generator target rotational speed NG*, the generator target torque TG* and the drive motor target torque TM* configure the control instruction value.

The rotor position θG and the generator rotational speed NG are proportional to each other, and the rotor position θM, the drive motor rotational speed NM and the velocity V are proportional to each other. Thus, the position sensor 38 and the generator rotational speed calculation processing module are allowed to function as a generator rotational speed detecting part to detect the generator rotational speed NG, the position sensor 39 and the drive motor rotational speed calculation processing module are allowed to function as a drive motor rotational speed detecting part to detect the drive motor rotational speed NM, and the position sensor 39 and the speed calculation processing module are allowed to function as a speed detecting part to detect the velocity V.

In the exemplary embodiment, the engine rotational speed sensor 52 detects the engine rotational speed NE, but the engine rotational speed NE can also be calculated by the engine control unit 46. The engine rotational speed NE can be calculated by the vehicle control apparatus 51. To this end, the vehicle control apparatus 51 is provided with an engine rotational speed calculation processing module, and the engine rotational speed calculation processing module calculates the engine rotational speed NE based on the drive motor rotational speed NM or the generator rotational speed NG in accordance with the rotational speed relational expression (1). In this case, the engine rotational speed calculation processing module functions as an engine rotational speed detecting part.

In the exemplary embodiment, the velocity V is calculated by the speed calculation processing module based on the rotor position θM, but it is acceptable that the ring gear rotational speed NR is detected to calculate the velocity V based on the ring gear rotational speed NR, or the velocity V is calculated based on the driving wheel rotational speed that is the rotational speed of the driving wheel 37. In this case, a ring gear rotational speed sensor and a driving wheel rotational speed sensor are disposed as a velocity detecting part.

In addition, an air conditioner as an accessory machine is joined to a crank shaft of the engine 11, not shown, through a pulley, a belt, and an air conditioning clutch. A switch of the air conditioner is operated to drive a starter motor to start the engine 11 as well as the air conditioning clutch, not shown, is engaged to transmit the rotation of the output shaft 12 to the air conditioner to operate the air conditioner.

Next, the operation of the control apparatus for driving the vehicle of the configuration will be described.

Figure 9:
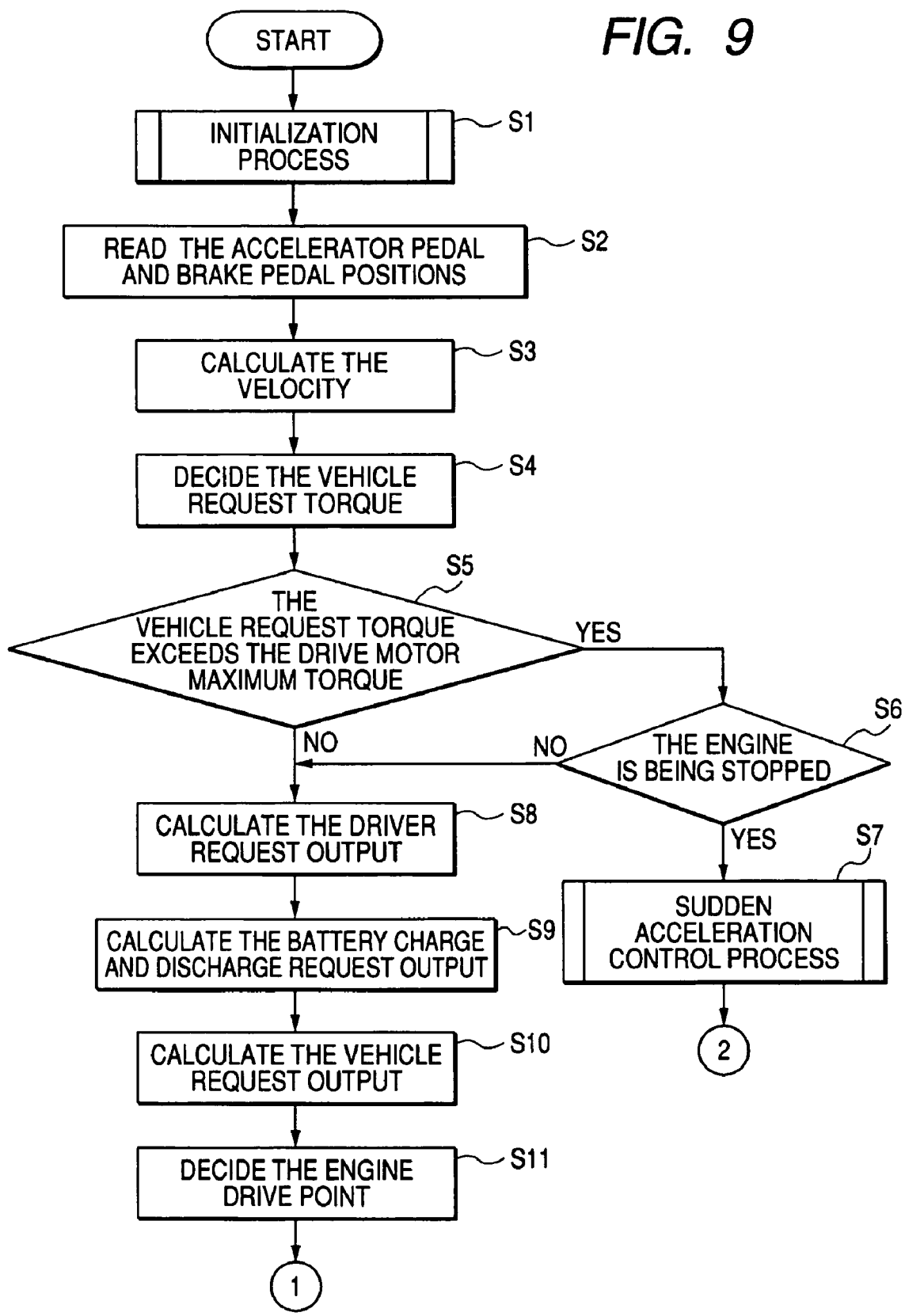
FIG. 9 is a first main flow chart illustrating the operation of the control apparatus for driving the vehicle in an exemplary embodiment consistent with the invention.
Figure 10:
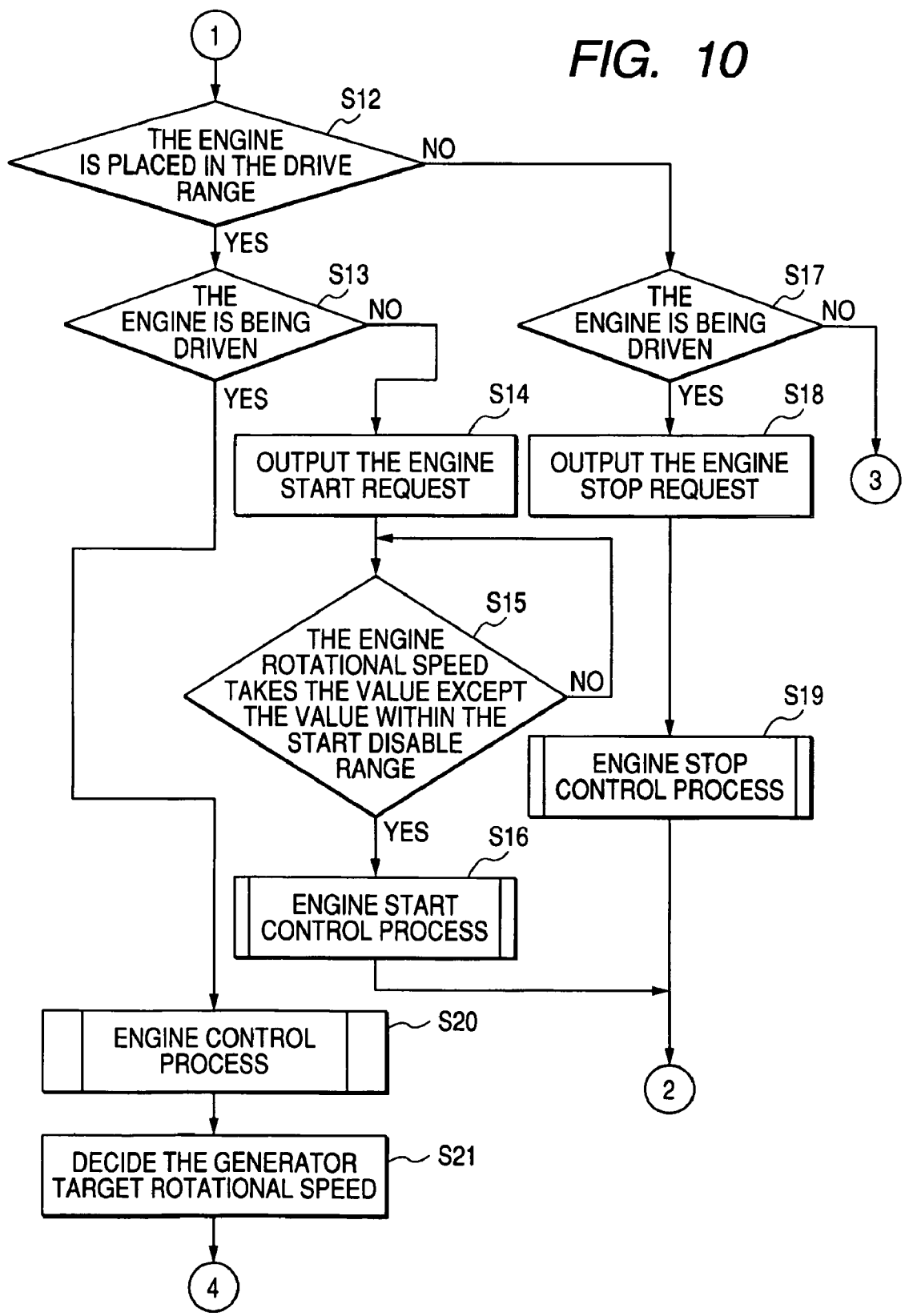
FIG. 10 is a second main flow chart illustrating the operation of the control apparatus for driving the vehicle in an exemplary embodiment consistent with the invention.
Figure 11:
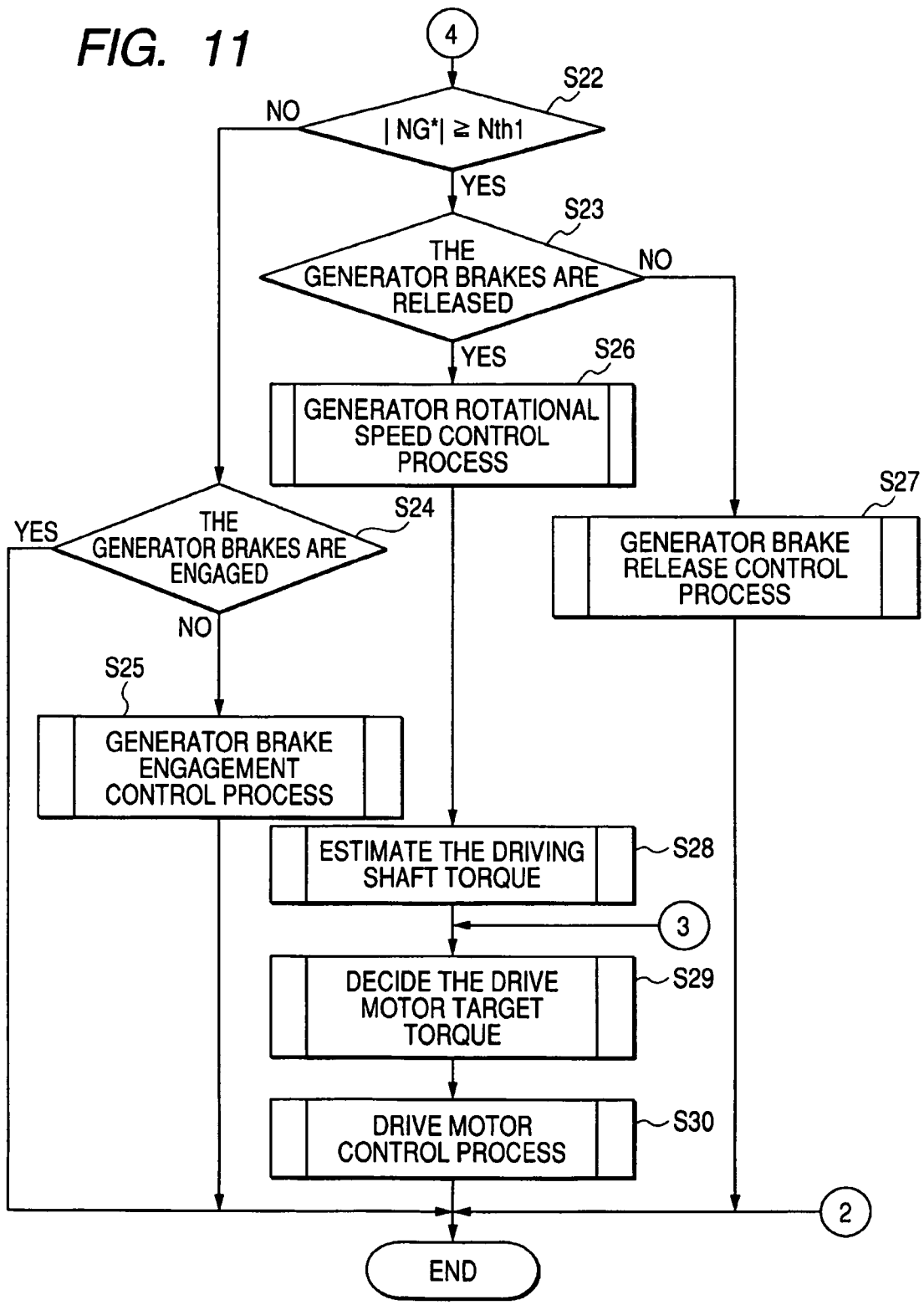
FIG. 11 is a third main flow chart illustrating the operation of the control apparatus for driving the vehicle in an exemplary embodiment consistent with the invention.
Figure 12:
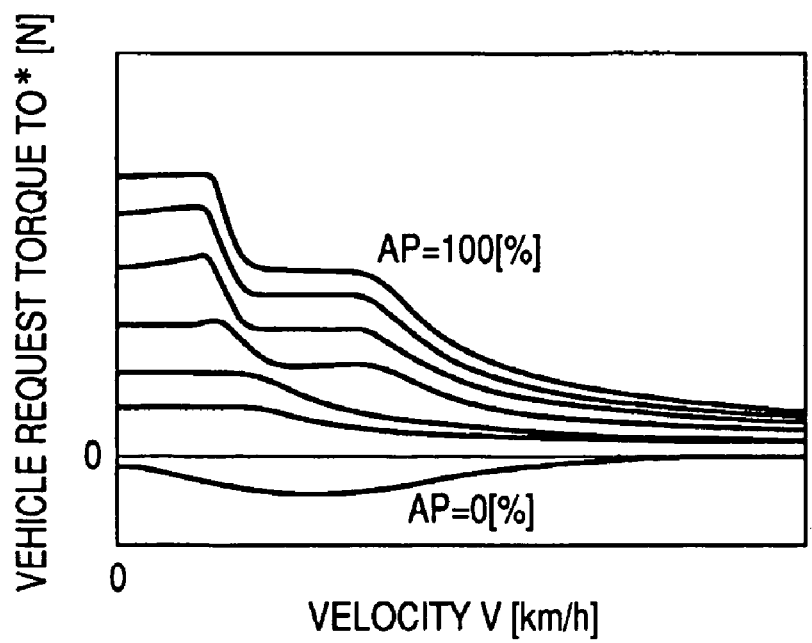
FIG. 12 is a diagram illustrating a first vehicle request torque map in an exemplary embodiment consistent with the invention.
Figure 13:
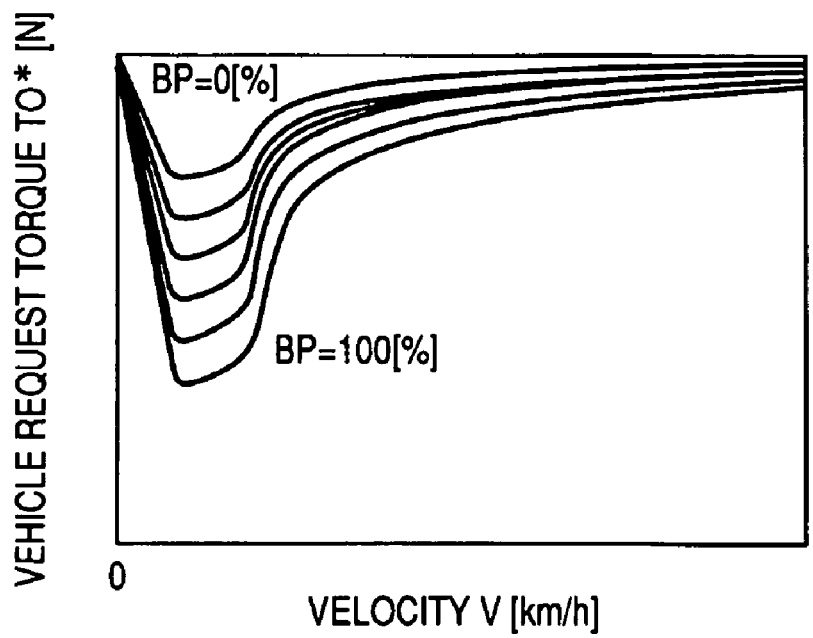
FIG. 13 is a diagram illustrating a second vehicle request torque map in an exemplary embodiment consistent with the invention.

FIG. 9 is a first main flow chart illustrating the operation of the control apparatus for driving the vehicle in the exemplary embodiment consistent with the invention, FIG. 10 is a second main flow chart illustrating the operation of the control apparatus for driving the vehicle in the exemplary embodiment consistent with the invention, FIG. 11 is a third main flow chart illustrating the operation of the control apparatus for driving the vehicle in the exemplary embodiment consistent with the invention, FIG. 12 is a diagram illustrating a first vehicle request torque map in the exemplary embodiment consistent with the invention, and FIG. 13 is a diagram illustrating a second vehicle request torque map in the exemplary embodiment consistent with the invention.

Figure 14:
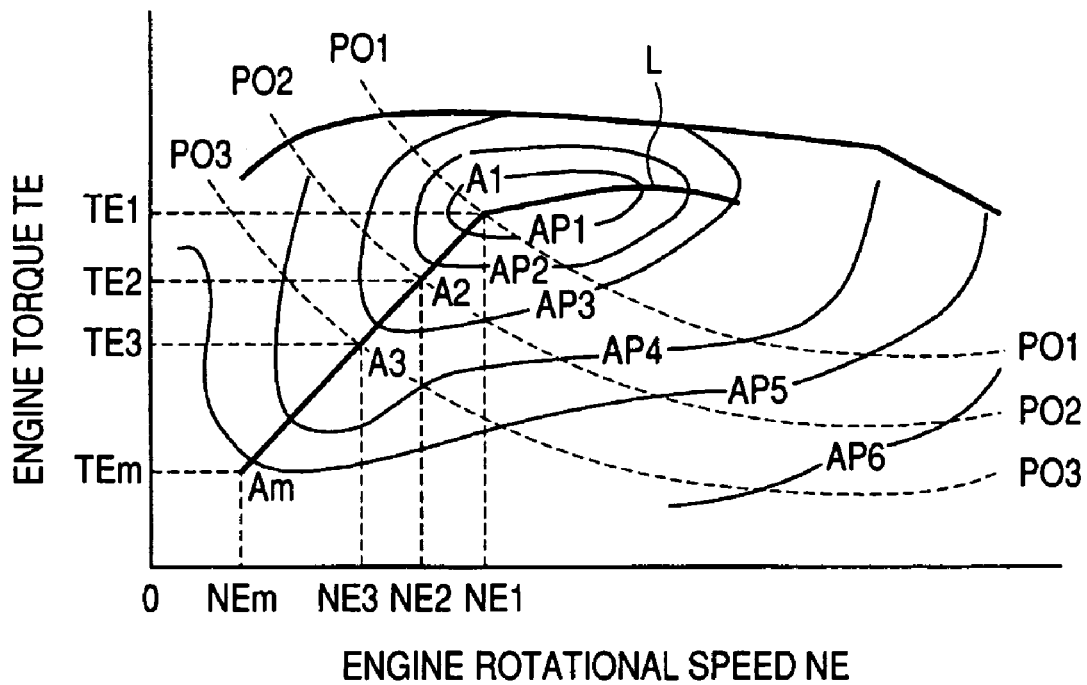
FIG. 14 is a diagram illustrating an engine target operational state map in an exemplary embodiment consistent with the invention.
Figure 15:
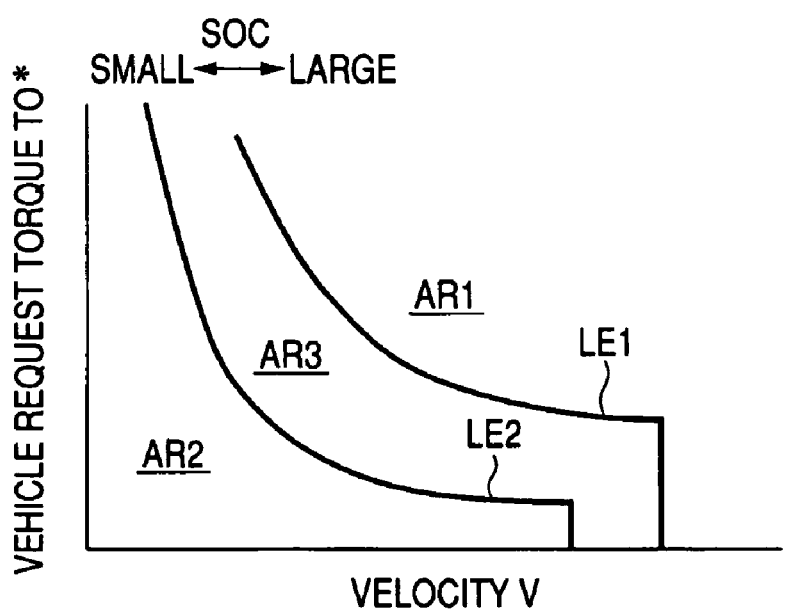
FIG. 15 is a diagram illustrating an engine drive range map in an exemplary embodiment consistent with the invention.
Figure 16:
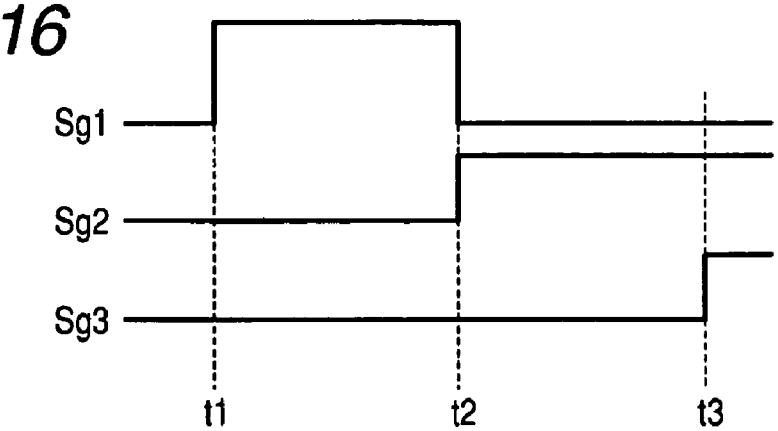
FIG. 16 is a time chart illustrating the operation of the vehicle control apparatus when the engine is started in an exemplary embodiment consistent with the invention.
Figure 17:
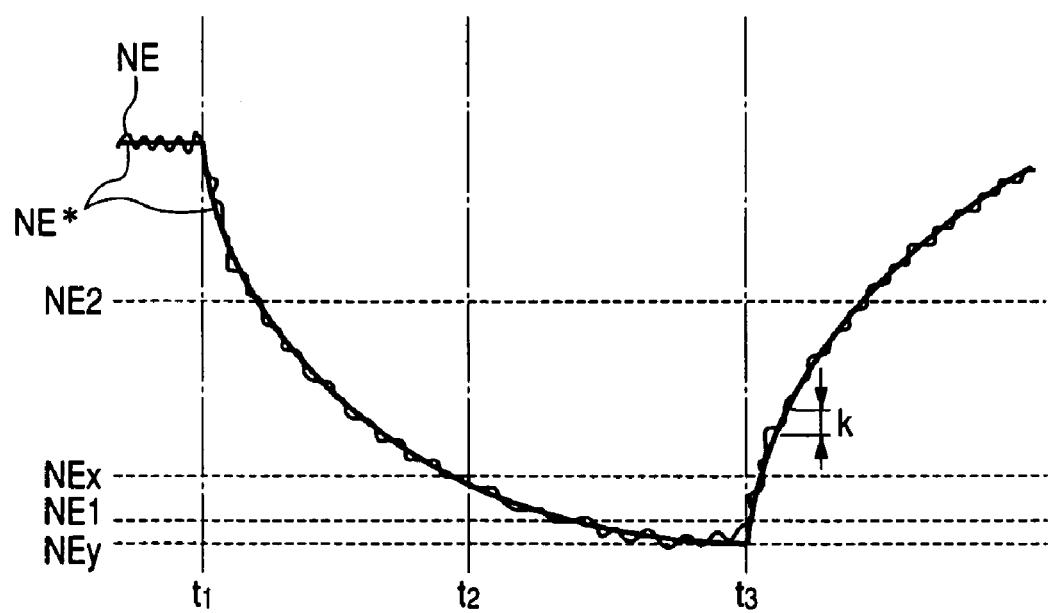
FIG. 17 is a time chart illustrating the state of generating vibrations when the engine is started in an exemplary embodiment consistent with the invention.

FIG. 14 is a diagram illustrating an engine target operational state map in the exemplary embodiment consistent with the invention, FIG. 15 is a diagram illustrating an engine drive range map in the exemplary embodiment consistent with the invention, FIG. 16 is a time chart illustrating the operation of the vehicle control apparatus when the engine is started in the exemplary embodiment consistent with the invention, and FIG. 17 is a time chart illustrating the state of generating vibrations when the engine is started in the exemplary embodiment consistent with the invention. In FIGS. 12, 13 and 15, the velocity V is shown on the horizontal axis, and the vehicle request torque TO* is shown on the longitudinal axis. In FIG. 14, the engine rotational speed NE is shown on the horizontal axis, and the engine torque TE is shown on the longitudinal axis.

First, an initialization processing module of the vehicle control apparatus 51 (FIG. 8), not shown, performs an initialization process to turn various variables to the initial value. Then, a vehicle request torque decision processing module of the vehicle control apparatus 51, not shown, performs a vehicle request torque decision process to read the accelerator pedal position AP from the accelerator switch 55 and the brake pedal position BP from the brake switch 62. The speed calculation processing module reads the rotor position θM, calculates the change rate ΔθM of the rotor position θM, and calculates the velocity V based on the change rate ΔθM and the gear ratio γV.

Subsequently, the vehicle request torque decision processing module refers to the first vehicle request torque map shown in FIG. 12 that is recorded in the recording device of the vehicle control apparatus 51 when the accelerator pedal 54 is pressed down, whereas it refers to the second vehicle request torque map shown in FIG. 13 that is recorded in the recording device when the brake pedal 61 is pressed down. It decides the vehicle request torque TO* that is required for running the hybrid vehicle and predetermined as corresponding to the accelerator pedal position AP, the brake pedal position BP and the velocity V.

Then, the vehicle control apparatus 51 determines whether the vehicle request torque TO* exceeds the drive motor maximum torque TMmax that indicates the maximum value of the drive motor torque TM. When the vehicle request torque TO* exceeds the drive motor maximum torque TMmax, the vehicle control apparatus 51 determines whether the engine 11 is stopped. When the engine 11 is stopped, a sudden acceleration control processing module of the vehicle control apparatus 51, not shown, performs a sudden acceleration control process to drive the drive motor 25 and the generator 16 to run the hybrid vehicle.

When the vehicle request torque TO* is equal to or below the drive motor maximum torque TMmax and when the vehicle request torque TO* exceeds the drive motor maximum torque TMmax and the engine 11 is not stopped, a driver request output calculation processing module of the vehicle control apparatus 51, not shown, performs a driver request output calculation process. It multiplies the vehicle request torque TO* by the velocity V to calculate the driver request output PD as:

$$PD=TO^* \cdot V$$

In addition, when the vehicle request torque TO* is compared with the drive motor maximum torque TMmax, the drive motor maximum torque TMmax is in fact multiplied by the gear ratio γMA from the output shaft 26 (FIG. 4) to the driving shaft 50, and the vehicle request torque TO* is compared with the multiplied value. It is acceptable to create the first and second vehicle request torque maps as the gear ratio γMA is included beforehand.

Subsequently, a battery charge and discharge request output calculation processing module of the vehicle control apparatus 51, not shown, performs a battery charge and discharge request output calculation process. It reads the battery remaining amount SOC from the battery remaining amount detecting unit 44, and calculates the battery charge and discharge request output PB based on the battery remaining amount SOC.

A vehicle request output calculation processing module of the vehicle control apparatus 51, not shown, performs a vehicle request output calculation process. It adds the driver request output PD to the battery charge and discharge request output PB to calculate the vehicle request output PO as:

$$PO=PD+PB$$

An engine target operational state setting processing module of the vehicle control apparatus 51, not shown, performs an engine target operational state setting process. The engine target operational state setting processing module refers to the engine target operational state map shown in FIG. 14 that is recorded in the recording device of the vehicle control apparatus 51, decides points A1 to A3 and Am as the drive points of the engine 11 that are in the engine target operational state, the points where lines POI, P02 and so on that indicate the vehicle request output PO intersect with the optimal fuel efficiency curve L where the efficiency of the engine 11 becomes highest in accelerator pedal positions AP1 to AP6, decides the engine torque TE1 to TE3 and TEm in the drive points as the engine target torque TE* that indicates a target value of the engine torque TE, and decides the engine rotational speeds NE1 to NE3 and NEm in the drive points as the engine target rotational speed NE*.

An engine drive determination processing module 80 of the vehicle control apparatus 51 performs an engine drive determination process. The engine drive determination processing module refers to the engine drive range map shown in FIG. 15 that is recorded in the recording device, and determines whether the engine 11 is placed in the drive range AR1. In FIG. 15, AR1 denotes the drive range where the engine 11 is driven, AR2 denotes the stop range where the drive of the engine 11 is stopped, and AR3 denotes the hysteresis range. LE1 denotes the line that the stopped engine 11 is driven, and LE2 denotes the line that the drive of the driving engine 11 is stopped. The line LE1 is moved to the right side of FIG. 15 and the drive range AR1 is narrowed as the battery remaining amount SOC is greater, whereas it is moved to the left side of FIG. 15 and the drive range AR1 is widened as the battery remaining amount SOC is smaller.

For example, when the engine 11 is placed in the drive range AR1 but the engine 11 is not driven because a driver presses down the accelerator pedal 54 or the battery remaining amount SOC becomes small, the engine drive determination processing module outputs an engine start request, and the engine start permission output control processing module 91 (FIG. 1) of the vehicle control apparatus 51 determines whether the engine rotational speed NE takes the value except the value within the predetermined start disable range. When the engine rotational speed NE takes the value except the value within the predetermined start disable range, the engine start control processing module 92 of the engine control unit 46 performs an engine start control process to start the engine 11. For example, when the engine 11 is removed from the drive range AR1 but the engine 11 is being driven because a driver releases the accelerator pedal 54 or the battery remaining amount SOC becomes greater, the engine drive determination processing module outputs an engine stop request, and an engine stop control processing module of the engine control unit 46, not shown, performs an engine stop control process to stop the drive of the engine 11.

As shown in FIGS. 16 and 17, when the engine stop request is outputted and the engine stop request signal Sg1 turned to high level at timing t1 in the vehicle control apparatus 51 while the engine 11 is being rotated at the engine rotational speed NE based on a given engine target rotational speed NE*, fuel injection and ignition are stopped as well as the engine target rotational speed NE* is reduced in a pattern as shown in FIG. 17, and the engine rotational speed NE correspondingly follows it to decrease.

Subsequently, when the engine stop request is not outputted and the engine start request is outputted at timing t2 in the vehicle control apparatus 51, the engine stop request signal Sg1 is turned to low level as well as the engine start request signal Sg2 is turned to high level. At this time, when an engine start permission is outputted in the vehicle control apparatus 51, fuel injection and ignition are then performed, and the engine rotational speed NE is reversed.

In this case, a resonance range based on the number of unique vibrations of the vehicle drive apparatus is formed between the engine rotational speeds NE1, NE2, and the engine rotational speed NEx at timing t2 takes the value within the resonance range. Thus, the engine rotational speed NE is reversed to correspondingly generate great vibrations in the engine rotational speed NE.

Then, the engine start permission output control processing module 91 performs an engine start permission output control. It sets the resonance range as the start disable range that inhibits the engine 11 from being started, and determines whether the engine rotational speed NE takes the value within the start disable range depending on the engine rotational speed NE being between the engine rotational speed NE1 as the low limit value and the engine rotational speed NE2 as the upper limit value as:

$$NE1 \leq NE \leq NE2$$

It does not output an engine start permission when the engine rotational speed NE takes the value within the start disable range, and turns the engine start permission signal Sg3 to low level. In this manner, starting the engine 11 is inhibited. The engine rotational speed NE is turned to NEy at timing t3 as:

$$NEy<NE1$$

When it takes the value except the value within the start disable range, the engine start permission output control processing module 91 outputs an engine start permission, and turns the engine start permission signal Sg3 to high level.

Consequently, the engine start control processing module 92 starts the engine 11.

When the engine stop request is outputted to correspondingly start reducing the engine rotational speed NE, the engine rotational speed NE takes the value within the start disable range and then an engine start request is outputted, the engine start permission output control processing module 91 delays the output of an engine start permission until the engine rotational speed NE takes the value except the value within the start disable range. When the engine rotational speed NE takes the value except the value within the start disable range before or after taking the value within the start disable range and then the engine start request is outputted, the module immediately outputs the engine start permission.

In this manner, the engine 11 is not started in the resonance range, and thus great vibrations can be prevented from being generated in the engine rotational speed NE as the engine 11 is started. Accordingly, discomfort to a driver does not result.

Since the amplitude k of the engine rotational speed NE is small, the teeth of various gears and splines configuring the vehicle drive apparatus are not hit against each other.

Also, since vibrations caused by the damper unit D and mounts become small, the gears, the splines, the damper unit D, and the mounts are not deteriorated. Accordingly, the durability of the vehicle drive apparatus can be prevented from being decreased.

On the other hand, when the engine 11 is not placed in the drive range AR1 and the engine 11 is not driven, a drive motor target torque calculation processing module of the vehicle control apparatus 51, not shown, performs a drive motor target torque calculation process. It calculates and decides the vehicle request torque TO* as the drive motor target torque TM*, and sends the drive motor target torque TM* to the drive motor control unit 49. A drive motor control processing module of the drive motor control unit 49, not shown, performs a drive motor control process to torque control the drive motor 25.

When the engine 11 is placed in the drive range AR1 and the engine 11 is being driven, an engine control processing module of the engine control unit 46, not shown, performs an engine control process to control the engine 11 by a given scheme.

Subsequently, a generator target rotational speed calculation processing module of the vehicle control apparatus 51, not shown, performs a generator target rotational speed calculation process. It reads the rotor position θM, calculates the ring gear rotational speed NR based on the rotor position θM and the gear ratio γR from the output shaft 26 to the ring gear R, reads the engine target rotational speed NE* decided in the engine target operational state setting process, and calculates and decides the generator target rotational speed NG* based on the ring gear rotational speed NR and the engine target rotational speed NE* by the rotational speed relational expression.

In the meantime, when the generator rotational speed NG is low in running the hybrid vehicle of the configuration by the drive motor 25 and the engine 11, power consumption becomes great, the power generation efficiency of the generator 16 is reduced, and the fuel efficiency of the hybrid vehicle deteriorates by that reduction. Then, when the absolute value of the generator target rotational speed NG* is smaller than a given rotational speed Nth1 (for example, 500 [rpm]), the generator brakes B are engaged to mechanically stop the generator 16 for improving the fuel efficiency.

To this end, a generator brake engagement control processing module of the vehicle control apparatus 51, not shown, performs a generator brake engagement control process to determine whether the absolute value of the generator target rotational speed NG* is equal to or above a given rotational speed Nth1. When the absolute value of the generator target rotational speed NG* is equal to or above the rotational speed Nth1, the generator brake engagement control processing module determines whether the generator brakes B are released. When the generator brakes B are released, a generator rotational speed control processing module of the generator brake engagement control processing module performs a generator rotational speed control process to torque control the generator 16. When the generator brakes B are not released, a generator brake release control processing module of the vehicle control apparatus 51, not shown, performs a generator brake release control process to release the generator brakes B.

In the generator rotational speed control process, the generator target torque TG* is decided, the generator 16 is torque controlled based on the generator target torque TG*, and the predetermined generator torque TG is generated. Then, the engine torque TE, the ring gear torque TR and the generator torque TG receive reaction force each other as described above. Therefore, the generator torque TG is converted to the ring gear torque TR, and is outputted from the ring gear R.

When the ring gear torque TR is outputted from the ring gear R, the generator rotational speed NG is correspondingly varied and then the ring gear torque TR is varied, the varied ring gear torque TR is transmitted to the driving wheel 37. Therefore, the ring gear torque TR is to be calculated as including the torque for the inertia (inertia of the rotor 21 and the rotor shaft) of the generator 16 associated with the variation in the generator rotational speed NG.

To this end, a ring gear torque calculation processing module of the vehicle control apparatus 51, not shown, performs a ring gear torque calculation process. It reads the generator target torque TG*, and calculates the ring gear torque TR based on the generator target torque TG* and the ratio of the number of teeth of the ring gear R to the numbers of teeth of the sun gear S.

More specifically, when the inertia of the generator 16 is set to InG and the angular acceleration of the generator 16 is set to αG, the sun gear torque TS that is the torque of the sun gear S can be obtained by subtracting the torque equivalent component (inertia torque) TGI of the inertia InG from the generator target torque TG* as:

$$TGI = InG \cdot \alpha G$$

resulting in:

$$\begin{aligned} TS &= TG^* - TGI \\ &= TG^* - InG \cdot \alpha G \end{aligned} \qquad (3)$$

The torque equivalent component TGI generally takes a positive value with respect to the accelerating direction in accelerating the hybrid vehicle, whereas it takes a negative value with respect to the accelerating direction in dropping the speed of the hybrid vehicle.

When the number of teeth of the ring gear R is ρ times the number of teeth of the sun gear S, the ring gear torque TR is ρ times the sun gear torque TS, and therefore the following equation is held as:

$$\begin{aligned} TR &= \rho \cdot TS \\ &= \rho \cdot (TG^* - TGI) \\ &= \rho \cdot (TG^* - InG \cdot \alpha G) \end{aligned} \qquad (4)$$

In this manner, the ring gear torque TR can be calculated from the generator target torque TG* and the torque equivalent component TGI.

A driving shaft torque estimation processing module of the vehicle control apparatus 51, not shown, performs a driving shaft torque estimation process. It estimates the torque in the output shaft 26, that is, the driving shaft torque TR/OUT based on the generator target torque TG* and the torque equivalent component TGI. More specifically, the driving shaft torque estimation processing module estimates and calculates the driving shaft torque TR/OUT based on the ring gear torque TR and the ratio of the number of teeth of the second counter drive gear 27 to the number of teeth of the ring gear R.

Since the generator target torque TG* is turned to zero (0) when the generator brakes B are engaged, the ring gear torque TR has a relationship proportional to the engine torque TE. When the generator brakes B are engaged, the driving shaft torque estimation processing module reads the engine torque TE, calculates the ring gear torque TR based on the engine torque TE by the torque relational expression, and estimates the driving shaft torque TR/OUT based on the ring gear torque TR and the ratio of the number of teeth of the second counter drive gear 27 to the number of teeth of the ring gear R.

Subsequently, the drive motor target torque calculation processing module performs the drive motor target torque calculation process. It subtracts the driving shaft torque TR/OUT from the vehicle request torque TO* to calculate and decide a shortfall of the driving shaft torque TR/OUT as the drive motor target torque TM*.

The drive motor control processing module performs the drive motor control process. It torque controls the drive motor 25 based on the decided drive motor target torque TM* for controlling the drive motor torque TM.

When the absolute value of the generator target rotational speed NG* is smaller than the rotational speed Nth1, the generator brake engagement control processing module determines whether the generator brakes B are engaged. When the generator brakes B are not engaged, the generator brake engagement control processing module causes the generator brakes B to be engaged.

Next, flow charts shown in FIGS. 9 to 11 will be described.

In Step S1 the initialization process is performed. In Step S2 the accelerator pedal position AP and the brake pedal position BP are read. In Step S3 the velocity V is calculated. In Step S4 the vehicle request torque TO* is decided. In Step S5 it is determined whether the vehicle request torque TO* exceeds the drive motor maximum torque TMmax. When the vehicle request torque TO* exceeds the drive motor maximum torque TMmax, the operation proceeds to Step S6, whereas when the vehicle request torque TO* is equal to or below the drive motor maximum torque TMmax, the operation proceeds to Step S8.

In Step S6 it is determined whether the engine 11 is stopped. When the engine 11 is stopped, the operation proceeds to Step S7, whereas when it is not stopped (it is being driven), the operation proceeds to Step S8. In Step S7 the sudden acceleration control is performed, and the process is ended. In Step S8 the driver request output PD is calculated. In Step S9 the battery charge and discharge request output PB is calculated. In Step S10 the vehicle request output PO is calculated. In Step S11 the drive point of the engine 11 is decided.

In Step S12 it is determined whether the engine 11 is placed in the drive range AR1. When the engine 11 is placed in the drive range AR1, the operation proceeds to Step S13, whereas when it is not placed in the drive range AR1, the operation proceeds to Step S17. In Step S13 it is determined whether the engine 11 is being driven. When the engine 11 is being driven, the operation proceeds to Step S20, whereas when it is not driven, the operation proceeds to Step S14.

In Step S14 the engine start request is output. In Step S15 it is determined whether the engine rotational speed NE takes the value except the value within the start disable range.

In Step S16 the engine start control process is performed, and the process is ended. In Step S17 it is determined whether the engine 11 is being driven. When the engine 11 is being driven, the operation proceeds to Step S18, whereas when it is not driven, the operation proceeds to Step S29. In Step S18 the engine stop request is output. In Step S19 the engine stop control process is performed, and the process is ended.

In Step S20 the engine control process is performed. In Step S21 the generator target rotational speed NG* is decided.

In Step S22 it is determined whether the absolute value of the generator target rotational speed NG is equal to or above the rotational speed Nth1. When the absolute value of the generator target rotational speed NG is equal to or above the rotational speed Nth1, the operation proceeds to Step S23, whereas when the absolute value of the generator target rotational speed NG is below the rotational speed Nth1, the operation proceeds to Step S24.

In Step S23 it is determined whether the generator brakes B are released. When the generator brakes B are released, proceed to Step S26, whereas when they are not released, the operation proceeds to Step S27.

In Step S24 it is determined whether the generator brakes B are engaged. When the generator brakes B are engaged, the process is ended, whereas when they are not engaged, the operation proceeds to Step S25. In Step S25 the generator brake engagement control process is performed, and the process is ended. In Step S26 the generator rotational speed control process is performed. In Step S27 the generator brake release control process is performed, and the process is ended. In Step S28 the driving shaft torque TR/OUT is estimated. In Step S29 the drive motor target torque TM* is decided. In Step S30 the drive motor control process is performed, and the process is ended.

Next, subroutines of the engine start control process at Step S16 as shown in FIG. 10 will be described.

Figure 18:
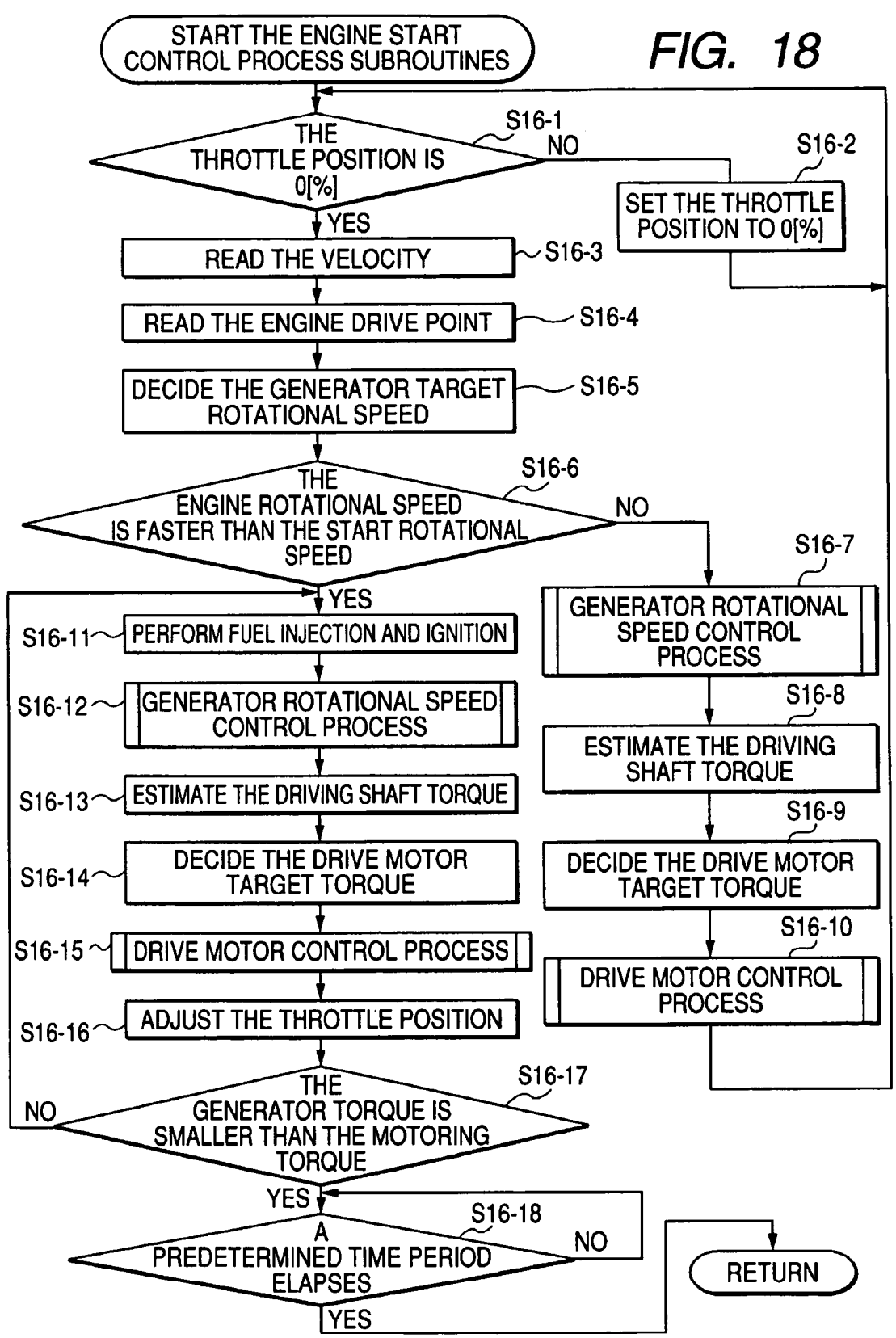
FIG. 18 is a diagram illustrating subroutines of an engine start control process in an exemplary embodiment consistent with the invention.

FIG. 18 is a diagram illustrating subroutines of the engine start control process in the exemplary embodiment consistent with the invention.

First, the engine start control processing module 92 (FIG. 1) reads the throttle position θ. When the throttle position θ is 0[%], it reads the velocity V calculated by the velocity calculation processing module, and reads the drive point of the engine 11 (FIG. 8) decided in the engine target operational state setting process.

Subsequently, a generator target rotational speed calculation processing module of the engine start control processing module 92, not shown, performs a generator target rotational speed calculation process. It reads the rotor position θM, calculates the ring gear rotational speed NR based on the rotor position θM and the gear ratio γR, reads the engine target rotational speed NE* at the drive point, and calculates and decides the generator target rotational speed NG* based on the ring gear rotational speed NR and the engine target rotational speed NE* by the rotational speed relational expression.

A start processing module of the engine start control processing module 92, not shown, performs a start process. It compares the engine rotational speed NE with the predetermined start rotational speed NEth1, and determines whether the engine rotational speed NE exceeds the start rotational speed NEth1. When the engine rotational speed NE exceeds the start rotational speed NEth1, the engine start control processing module 92 performs fuel injection and ignition in the engine 11.

Subsequently, a generator rotational speed control processing module of the engine start control processing module 92 performs a generator rotational speed control process based on the generator target rotational speed NG*. The generator rotational speed control processing module increases the generator rotational speed NG, and correspondingly increases the engine rotational speed NE.

The engine start control processing module 92 estimates the driving shaft torque TR/OUT as it did at Steps S28 to S30, and decides the drive motor target torque TM*. A drive motor control processing module of the engine start control processing module 92, not shown, performs a drive motor control process.

The engine start control processing module 92 adjusts the throttle position θ so that the engine rotational speed NE is turned to the engine target rotational speed NE*. Subsequently, in order to determine whether the engine 11 is normally driven, the engine start control processing module 92 determines whether the generator torque TG is smaller than the motoring torque TEth associated with starting the engine 11, and waits for a given time period to elapse as the generator torque TG is smaller than the motoring torque TEth.

When the engine rotational speed NE is equal to or below the start rotational speed NEth1, the generator rotational speed control processing module performs the generator rotational speed control process based on the generator target rotational speed NG*, the engine start control processing module 92 then estimates the driving shaft torque TR/OUT as it did at Steps S28 to S30, and the drive motor control processing module decides the drive motor target torque TM*.

Next, a flow chart as illustrated in FIG. 18 will be described.

In Step S16-1 it is determined whether the throttle position θ is 0[%]. When the throttle position θ is 0[%], the operation proceeds to Step S16-3, whereas when it is not 0[%], the operation proceeds to Step S16-2. In Step S16-2 the throttle position θ is set to 0[%], and the operation returns to Step S16-1. In Step S16-3 the velocity V is read. In Step S16-4 the drive point of the engine 11 is read. In Step S16-5 the generator target rotational speed NG* is decided.

In Step S16-6 it is determined whether the engine rotational speed NE exceeds the start rotational speed NE-th1. When the engine rotational speed NE exceeds the start rotational speed NEth1, the operation proceeds to Step S16-11, whereas when the engine rotational speed NE is equal to or below the start rotational speed NEth1, the operation proceeds to Step S16-7.

In Step S16-7 the generator rotational speed control process is performed. In Step S16-8 the driving shaft torque TR/OUT is estimated. In Step S16-9 the drive motor target torque TM* is decided. In Step S16-10 the drive motor control process is performed, and the process returns to Step S16-1.

In Step S16-11 fuel injection and ignition is performed. In Step S16-12 the generator rotational speed control process is performed. In Step S16-13 the driving shaft torque TR/OUT is estimated. In Step S16-14 the drive motor target torque TM* is decided. In Step S16-15 the drive motor control process is performed. In Step S16-16 the throttle position θ is adjusted.

In Step S16-17 it is determined whether the generator torque TG is smaller than the motoring torque TEth. When the generator torque TG is smaller than the motoring torque TEth, the operation proceeds to Step S16-18, whereas when the generator torque TG is equal to or above the motoring torque TEth, the operation returns to Step S16-11. In Step S16-18 the operation waits for a given time period to elapse, and then returns to Step S16-1.

Next, subroutines of the engine stop control process at Step S19 shown in FIG. 10 will be described.

Figure 19:
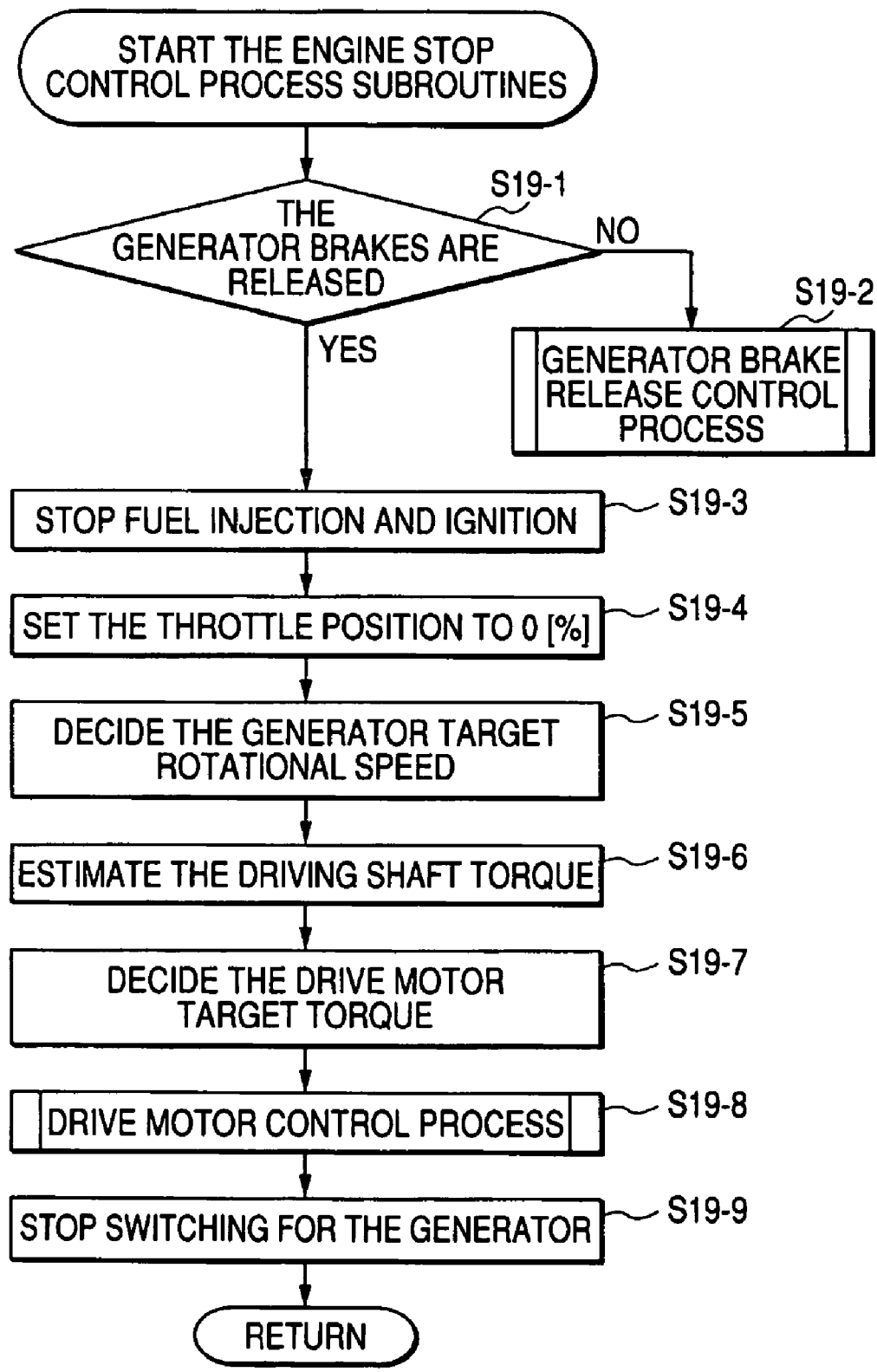
FIG. 19 is a diagram illustrating subroutines of an engine stop control process in an exemplary embodiment consistent with the invention.

FIG. 19 is a diagram illustrating subroutines of the engine stop control process in the exemplary embodiment consistent with the invention.

First, the engine stop control processing module determines whether the generator brakes B (FIG. 8) are released. When the generator brakes B are not released and they are engaged, a generator brake release control processing module of the engine stop control processing module performs a generator brake release control process to release the generator brakes B.

When the generator brakes B are released, a stop processing module of the engine stop control processing module performs a stop process. It stops fuel injection and ignition in the engine 11 to turn the throttle position θ to 0[%].

Subsequently, a generator target rotational speed calculation processing module of the engine stop control processing module performs a generator target rotational speed calculation process. It reads the ring gear rotational speed NR, and decides the generator target rotational speed NG* based on the ring gear rotational speed NR and the engine target rotational speed NE* (0[rpm]) by the rotational speed relational expression. After a generator rotational speed control processing module of the engine stop control processing module performs a generator rotational speed control process, the engine stop control processing module estimates the driving shaft torque TR/OUT as done at Steps S28 to S30, and decides the drive motor target torque TM*. A drive motor control processing module of the engine stop control processing module, not shown, performs a drive motor control process.

Subsequently, the generator rotational speed control processing module determines whether the engine rotational speed NE is equal to or below the stop rotational speed NEth2. When the engine rotational speed NE is equal to or below the stop rotational speed NEth2, it stops switching for the generator 16 and shuts down the generator 16.

Next, a flow chart as illustrated in FIG. 19 will be described.

In Step S19-1 it is determined whether the generator brakes B are released. When the generator brakes B are released, the operation proceeds to Step S19-3, whereas when they are not released, the operation proceeds to Step S19-2. In Step S19-2 the generator brake release control process is performed. In Step S19-3 the fuel injection and ignition are stopped. In Step S19-4 the throttle position θ is set to 0[%]. In Step S19-5 the generator target rotational speed NE* is decided. In Step S19-6 the driving shaft torque TR/OUT is estimated. In Step S19-7 the drive motor target torque TM* is decided. In Step S19-8 the drive motor control process is performed. In Step S19-9 switching for the generator 16 is stopped, and returns to Step S19-1.

In the exemplary embodiment, the engine 11 is started and stopped based on whether the engine 11 is placed in the resonance range. However, the invention can be applied when the engine 11 is started as the air conditioner is started, or when the engine 11 is stopped as the air conditioner is stopped.

In the exemplary embodiment, the resonance range is set as the start disable range, but a given margin α is added to the resonance range to set the start disable range, allowing that the start disable range is wider than the resonance range.

More specifically, when the engine rotational speed NE is as:

$$NE1-\alpha \leq NE \leq NE2+\alpha,$$

starting the engine 11 can be inhibited.

In addition, the resonance range and a range lower than the engine rotational speed NE1 can be set as the start disable range. In this case, when the engine rotational speed NE is as:

$$0 \leq NE \leq NE2,$$

starting the engine 11 can be inhibited.

The invention is not limited to the exemplary embodiment, which can be modified variously based on the teachings of the invention as would be understood by those skilled in the art, and does not exclude modifications from the scope of the invention.

What is claimed is:

1. A control apparatus for driving a vehicle comprising:
   an engine start permission output control processing module operable to:
   read engine rotational speed;
   determine whether the engine rotational speed takes a value within a predetermined start disable range;
   output an engine start permission when the engine rotational speed takes a value not within the start disable range;
   an engine start control processing module which starts an engine when the engine start permission is output:
   an engine control module which controls the engine rotational speed based on a predetermined engine target rotational speed; and
   an engine drive determination processing module operable to output an engine start request and an engine stop request based on whether the engine is placed in a drive range,
   wherein the engine start permission output control processing module determines whether the engine rotational speed takes the value within the start disable range while the engine control module is controlling reducing the engine rotational speed as the engine stop request is output, and
   wherein when the engine stop request is outputted to correspondingly start reducing the engine rotational speed and the engine rotational speed takes the value within the start disable range and then the engine start request is outputted, the engine control module continues to control reducing the engine rotational speed until the engine rotational speed takes a value that is not within the start disable range.

2. The control apparatus for driving the vehicle according to claim 1, wherein when the engine stop request is outputted to correspondingly start reducing the engine rotational speed, the engine rotational speed takes the value not within the start disable range before or after the engine rotational speed takes the value within the start disable range and then the engine start request is outputted, the engine start permission output control processing module immediately outputs the engine start permission.

3. The control apparatus for driving the vehicle according to claim 1, wherein the start disable range is set in a resonance range that is formed based on the number of unique vibrations of a vehicle drive apparatus.

4. The control apparatus for driving the vehicle according to claim 1, wherein the start disable range is set by adding a margin to a resonance range that is formed based on the number of unique vibrations of a vehicle drive apparatus.

5. The control apparatus for driving the vehicle according to claim 1, wherein the start disable range is set in a resonance range that is formed based on the number of unique vibrations of a vehicle drive apparatus, and in a range lower than a low limit value of the engine rotational speed that forms the resonance range.

6. A control method for driving a vehicle comprising:
   reading engine rotational speed;
   determining whether the engine rotational speed takes a value within a predetermined start disable range;
   outputting an the engine start permission when the engine rotational speed takes a value not within the start disable range;
   starting an engine when the engine start permission is output;
   controlling the engine rotational speed based on a predetermined engine target rotational speed;
   outputting an engine start request and an engine stop request based on whether the engine is placed in a drive range,
   determining whether the engine rotational speed takes the value within the start disable range while controllably reducing the engine rotational speed as the engine stop request is output, and
   wherein when the engine stop request is outputted to correspondingly start reducing the engine rotational speed and the engine rotational speed takes the value within the start disable range and then the engine start request is outputted, continuing to controllably reduce the engine rotational speed until the engine rotational speed takes a value that is not within the start disable range.

* * * * *